US012361441B2

(12) United States Patent
Schubert et al.

(10) Patent No.: US 12,361,441 B2
(45) Date of Patent: Jul. 15, 2025

(54) INVENTORY INGESTION, IMAGE PROCESSING, AND MARKET DESCRIPTOR PRICING SYSTEM

(71) Applicant: Mercari, Inc., Palto Alto, CA (US)

(72) Inventors: Shida Schubert, Fairfax, CA (US); John Lagerling, Los Altos Hills, CA (US)

(73) Assignee: MERCARI, INC., Palo Alto, CA (US)

( * ) Notice: Subject to any disclaimer, the term of this patent is extended or adjusted under 35 U.S.C. 154(b) by 184 days.

(21) Appl. No.: 18/130,686

(22) Filed: Apr. 4, 2023

(65) Prior Publication Data
US 2023/0245155 A1 Aug. 3, 2023

Related U.S. Application Data

(62) Division of application No. 16/288,199, filed on Feb. 28, 2019, now Pat. No. 11,631,096.
(Continued)

(51) Int. Cl.
*G06Q 30/0201* (2023.01)
*G06F 16/532* (2019.01)
*G06Q 30/0601* (2023.01)

(52) U.S. Cl.
CPC ....... *G06Q 30/0206* (2013.01); *G06F 16/532* (2019.01); *G06Q 30/0629* (2013.01); *G06Q 30/0641* (2013.01)

(58) Field of Classification Search
CPC ........... G06Q 30/0601; G06Q 30/0206; G06Q 30/0629; G06Q 30/0641; G06F 16/532
See application file for complete search history.

(56) References Cited

U.S. PATENT DOCUMENTS 8,868,444 B2    10/2014 Morris et al.
11,074,634 B2    7/2021 Oh et al.
(Continued)

FOREIGN PATENT DOCUMENTS

JP    2004005240 A    1/2004
JP    2005107952 A    4/2005
(Continued)

OTHER PUBLICATIONS

R. Fasuga, T. Drabek, G. Toporkova and L. Holub, "Expert System for Data Identification in Auction System along with Market Trends Analysis," 2010 IEEE 7th International Conference on E-Business Engineering, Shanghai, China, 2010, pp. 36-41, doi: 10.1109/ICEBE. 2010.45. (Year: 2010).*
(Continued)

*Primary Examiner* — Jeff Zimmerman
*Assistant Examiner* — Tayar M Kyu
(74) *Attorney, Agent, or Firm* — Sterne, Kessler, Goldstein & Fox P.L.L.C.

(57) ABSTRACT

Disclosed herein are system, method, and computer program product embodiments for providing inventory ingestion and pricing system. An embodiment operates by determining an identification of a for sale object to be sold on an electronic marketplace. A set of items similar to the identification of the for sale object are identified from the marketplace. A price of each of at least a subset of the set of similar items that have sold through the electronic marketplace is determined. A sale price is generated for the for sale object based on the determined prices of the items of the subset. An image for one or more of the subset of items, is retrieved from the electronic marketplace. A market descriptor comprising the sale price and the retrieved one or more images is generated. The market descriptor for display is provided for display.

14 Claims, 11 Drawing Sheets

Related U.S. Application Data

(60) Provisional application No. 62/740,030, filed on Oct. 2, 2018.

(56) References Cited

U.S. PATENT DOCUMENTS

| | | | |
|---|---|---|---|
| 11,282,100 | B2 | 3/2022 | Oh et al. |
| 11,341,550 | B2 | 5/2022 | Schubert et al. |
| 11,631,096 | B2 | 4/2023 | Schubert et al. |
| 11,651,410 | B2 | 5/2023 | Schubert et al. |
| 11,816,686 | B2 | 11/2023 | Lagerling et al. |
| 2001/0037279 | A1 | 11/2001 | Yeo |
| 2002/0116348 | A1 | 8/2002 | Phillips et al. |
| 2003/0083961 | A1 | 5/2003 | Bezos et al. |
| 2003/0200156 | A1* | 10/2003 | Roseman ............ G06Q 30/0619 705/26.44 |
| 2003/0204449 | A1 | 10/2003 | Kotas et al. |
| 2004/0204991 | A1 | 10/2004 | Monahan |
| 2008/0004987 | A1 | 1/2008 | Choe et al. |
| 2008/0077508 | A1 | 3/2008 | Bezos et al. |
| 2008/0097827 | A1 | 4/2008 | Leach et al. |
| 2008/0263459 | A1 | 10/2008 | Altberg et al. |
| 2010/0042467 | A1 | 2/2010 | Bundy et al. |
| 2011/0099085 | A1* | 4/2011 | Hamilton ............ G06Q 30/0282 705/347 |
| 2011/0276385 | A1 | 11/2011 | Keller |
| 2011/0288962 | A1 | 11/2011 | Rankin et al. |
| 2012/0166298 | A1 | 6/2012 | Smith et al. |
| 2012/0197716 | A1 | 8/2012 | Rampbell |
| 2012/0275642 | A1 | 11/2012 | Aller et al. |
| 2013/0191213 | A1 | 7/2013 | Beck et al. |
| 2014/0100991 | A1 | 4/2014 | Lenahan et al. |
| 2014/0136289 | A1 | 5/2014 | Settgast |
| 2014/0278595 | A1 | 9/2014 | Werneke |
| 2015/0058150 | A1* | 2/2015 | Gura ................ G06Q 30/0601 705/26.3 |
| 2015/0112836 | A1 | 4/2015 | Godsey et al. |
| 2015/0161635 | A1 | 6/2015 | Yuan et al. |
| 2015/0186989 | A1 | 7/2015 | Kneen et al. |
| 2015/0379460 | A1 | 12/2015 | Zamer |
| 2015/0379601 | A1 | 12/2015 | Ouimet |
| 2016/0132840 | A1 | 5/2016 | Bowles et al. |
| 2016/0217509 | A1 | 7/2016 | Eggleston et al. |
| 2016/0358235 | A1 | 12/2016 | Langis |
| 2017/0103623 | A1 | 4/2017 | Sugiyama et al. |
| 2017/0109767 | A1 | 4/2017 | Shpanya et al. |
| 2017/0124635 | A1 | 5/2017 | Shao |
| 2017/0207916 | A1 | 7/2017 | Luce et al. |
| 2017/0228744 | A1 | 8/2017 | Booth et al. |
| 2017/0293973 | A1 | 10/2017 | Lustyk et al. |
| 2017/0293974 | A1 | 10/2017 | Konduru |
| 2017/0372392 | A1 | 12/2017 | Metnick et al. |
| 2018/0089833 | A1 | 3/2018 | Lewis |
| 2018/0096417 | A1 | 4/2018 | Cook et al. |
| 2018/0108066 | A1 | 4/2018 | Kale et al. |
| 2018/0276710 | A1 | 9/2018 | Tietzen et al. |
| 2019/0340013 | A1 | 11/2019 | Cella |
| 2020/0090156 | A1 | 3/2020 | Cella |
| 2020/0104868 | A1 | 4/2020 | Schubert et al. |
| 2020/0160422 | A1 | 5/2020 | Schubert et al. |
| 2020/0394708 | A1 | 12/2020 | Cella |

FOREIGN PATENT DOCUMENTS

| | | |
|---|---|---|
| JP | 2008052672 A | 3/2008 |
| JP | 2018049372 A | 3/2018 |
| KR | 20140105313 A | 9/2014 |
| KR | 10-2016-0122528 A | 10/2016 |
| WO | WO 2018100570 A1 | 6/2018 |

OTHER PUBLICATIONS

Examination report No. 1 for standard patent application, dated May 8, 2024, for Australian Patent Application No. 2019355815, 6 pages.

Gupta, Rajan & Pathak, Chaitanya. (2014). A Machine Learning Framework for Predicting Purchase by Online Customers based on Dynamic Pricing. Procedia Computer Science. 36. 10.1016/j.procs.2014.09.060. (Year: 2014).

European Search Report directed to related European Application No. 19868964.8, mailed on May 25, 2022; 8 pages.

International Search Report and Written Opinion directed to related International Application No. PCT/US2019/053393, mailed on Mar. 5, 2020; 12 pages.

International Preliminary Report on Patentability directed to related International Application No. PCT/US2019/053393, mailed on Mar. 23, 2021; 9 pages.

F. Liang, W. Yu, D. An, Q. Yang, X. Fu and W. Zhao, "A Survey on Big Data Market: Pricing, Trading and Protection," in IEEEAccess, vol. 6, pp. 15132-15154, 2018, doi: 10.1109/ACCESS.2018.2806881. (Year: 2018).

Office Action for Korean Application No. 20217013238, mailed on Apr. 30, 2025, 9 Pages.

\* cited by examiner

INVENTORY INGESTION, IMAGE PROCESSING, AND MARKET DESCRIPTOR PRICING SYSTEM

CROSS-REFERENCE TO RELATED APPLICATIONS

This application is a divisional application of and claims priority to U.S. patent application Ser. No. 16/288,199 "Inventory Ingestion, Image Processing, and Market Descriptor Pricing System," filed on Feb. 28, 2019, which claims priority to U.S. Provisional Patent Application No. 62/740,030 titled "Inventory Ingestion, Image Processing, and Market Descriptor Pricing System," filed on Oct. 2, 2018, both of which are herein incorporated by reference in its entirety.

This application is related to U.S. patent application Ser. No. 16/288,158 titled "Determining Sellability Score and Cancellability Score," filed herewith; U.S. patent application Ser. No. 16/288,203 titled "Inventory Ingestion and Pricing System," filed herewith; U.S. patent application Ser. No. 16/288,379 titled "Probabilistic Item Matching and Searching," filed herewith; and U.S. patent application Ser. No. 16/288,373 titled "Probabilistic Search Biasing and Recommendations," filed herewith, all of which are herein incorporated by reference in their entireties.

TECHNICAL FIELD

The technical field is directed to electronic commerce and processing, particularly related to identifying and pricing objects for sale on an electronic marketplace.

BACKGROUND

There are many websites and apps that allow users to sell new or used products. However, creating profiles or listings for each product to be sold is often cumbersome and time consuming for a user. This listing creation process may require both time and computer processing resources requiring a user to take pictures of a product, write up a description, determine pricing, etc. Additionally, listing creation by a user, particularly with regard to pricing, may consume substantial network bandwidth in multiple back-and-forth communications with a variety of websites, such as a marketplace, as a user performs searches for similar products and tries to determine how to price a product for sale.

As a result, this manual, resource intensive listing process may deter users from selling products they would otherwise be interested in selling. For example, a user may not have the time, computer processing resources, and/or communications bandwidth to generate a listing and/or determine pricing. This decision not to sell may cost these websites and apps potential commissions and listing fees that could have been earned through the posting and sale, cost the seller revenue that could have been earned through a sale, and cost potential buyers the enjoyment of the product they would have purchased.

BRIEF SUMMARY OF SELECTED EMBODIMENTS

In an embodiment, a computer-implemented method and system that receives an image including an object for sale from a mobile device is described. An electronic marketplace is determined to include one or more images of pre-identified objects that have sold. The object from the image is identified based on a comparison of the received image with the images of the one or more of the pre-identified objects from the electronic marketplace. The price for each of a subset of the one or more of the pre-identified objects that have sold is identified from the electronic marketplace. A sale price for the object for sale is generated based on the determined prices. The sale price for the object for sale is provided to the mobile device.

In an embodiment, a computer-implemented method and system that identifies an e-mail receipt identifying a purchased object is described. The e-mail receipt is parsed for the identification of the purchased object. A set of items similar to the purchased object is identified from an electronic marketplace. A price for a subset of the identified set of similar items that have sold on the electronic marketplace is determined. A sale price is generated for the purchased object based on the determined prices for the subset of similar items. The sale price is provided responsive to the identification of the purchased object.

In an embodiment, a computer-implemented method and system that receives a selection of a resell icon associated with a purchase history page of a retailer is described. An object associated with the purchase history page of the retailer that was purchased prior to receiving the selection is identified. A set of items similar to the identified purchased object is identified from an electronic marketplace. A price for each of at least a subset of the set of similar items that have sold on the electronic marketplace is determined. A sale price is generated for the purchased object based on the determined prices for the subset of similar items. The sale price is provided responsive to the identifying the purchased object.

In an embodiment, a computer-implemented method and system that determines an identification of a for sale object to be sold on an electronic marketplace is described. A set of items similar to the identification of the for sale object is identified from the electronic marketplace. A price of each of at least a subset of the set of similar items that have sold through the electronic marketplace is determined. A sale price for the for sale object is generated based on the determined prices of the items of the subset. An image for one or more of the subset of items is retrieved from the electronic marketplace. A market descriptor including the sale price and the retrieved one or more images is generated. The market descriptor is provided for display.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an inventory ingestion and pricing system.

Automatic Inventory Ingestion Based on Analyzing Images

Figure 1:
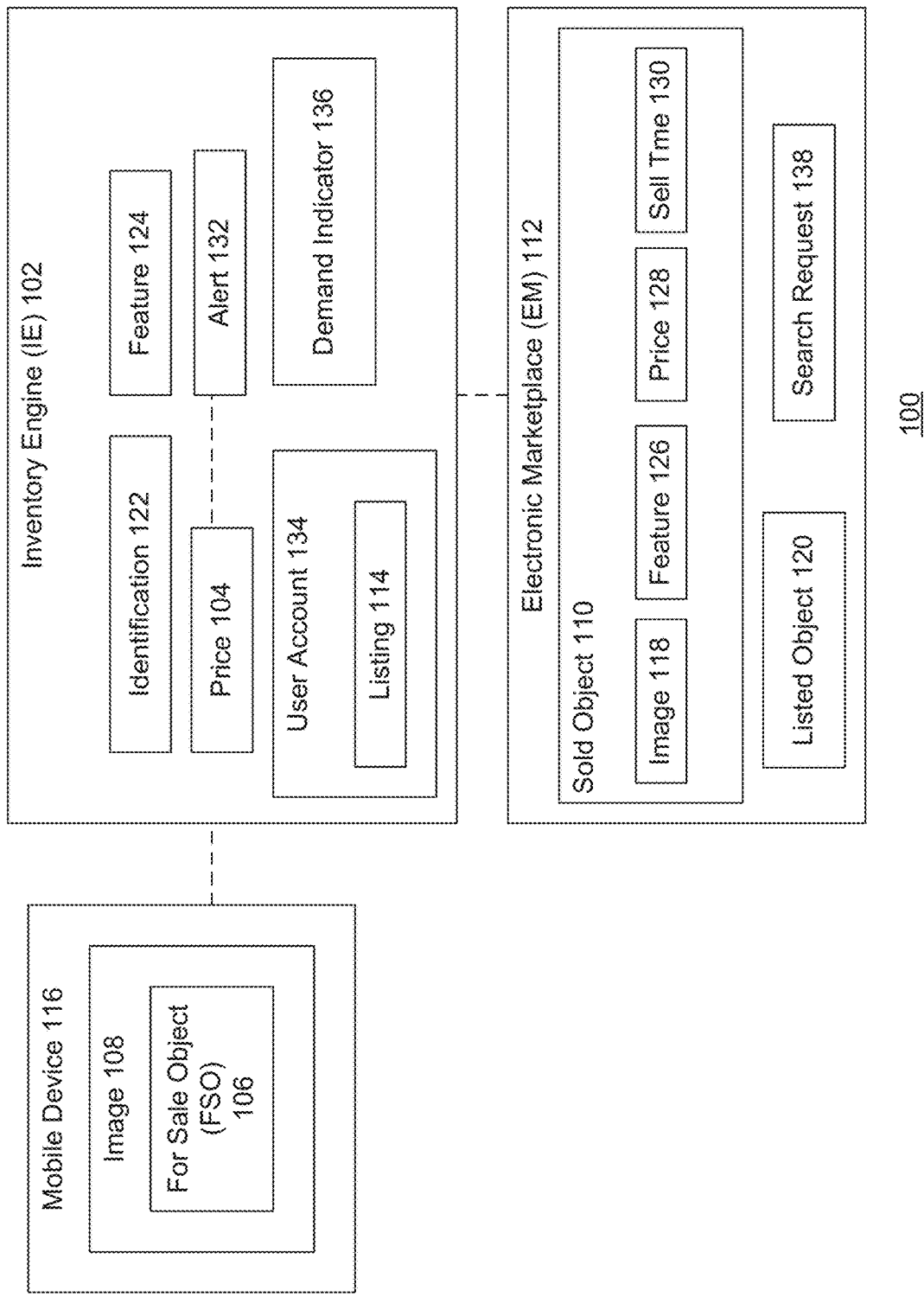
FIG. 1 is a block diagram illustrating an example inventory ingestion engine and pricing system that identifies and prices for sale objects from images, according to some embodiments.

FIG. 1 is a block diagram 100 illustrating an example inventory ingestion engine and pricing system that identifies and prices for sale objects from images, according to some embodiments. System 100 may simplify the process of listing items for sale on an electronic marketplace (EM) 112.

In an embodiment, an inventory engine (IE) 102 may receive an image 108 of a for sale object (FSO 106) from a mobile device 116. For example, a user may use their mobile device 116 to take a picture or video of FSO 106. FSO 106 may be an object, item, product, or collection or set of products that a user is considering listing for sale, individually or together. Example FSOs 106 include motor vehicles, electronics, clothes, appliances, furniture, office supplies, collector's items, etc.

IE 102 may identify FSO 106 from image 108 (and other information that may be received from mobile device 116) and generate a price 104 for the FSO 106 based on a pricing history of similar objects from EM 112. The similar objects may include sold objects 110 and/or listed objects 120. For example, based on the pricing history 128 of the similarly sold objects 110, IE 102 may generate a projected sale price 104 for FSO 106.

EM 112 may include a website or collection of webpages or listings 114 that enable users to list items for sale that are available for purchase. The listings 114 may include purchase now pricing, auction based pricing, or best offer requests or purchases, to name just some examples.

In an embodiment, IE 102 or EM 112 may track listing, purchase, and pricing histories for different items or objects listed and/or sold on EM 112. For example, EM 112 may track how long an item has been listed 130, the pricing history of an item between the time it is listed and sold 128, geographic locations of sales and purchase, and other listing, sale, and purchase information. This information may be used by IE 102 in generating a projected or recommended price 104 for FSO 106.

In an embodiment, IE 102 may also automatically generate and submit a listing 114 for FSO 106 on EM 112. And upon a user request, or when a particular price target or alert 132 is reached, submit listing 114 to list FSO 106 for sale on EM 112.

Image 108 may include one or more pictures or videos of an FSO 106. For example, image 108 may include images taken from different angles, perspectives, or with different lighting or filters. In an embodiment, image 108 may include pictures of a model number, manufacturer name, serial number, receipt, or other object or feature or identifying information. In an embodiment, image 108 may include pictures taken of markings, including damage, on FSO 106.

In an embodiment, image 108 may include pictures or a video of one or more objects of a collection. For example, a user may have a collection of baseball cards, and may take a picture of each card, and submit all of the pictures as a collection to be sold together. Or, image 108 may include a video taken of all the cards of the set. In an embodiment, image 108 may include any visual multimedia, including augmented realty or virtual reality based pictures, screenshots, renderings, and/or video.

In an embodiment, image 108 may include multiple different FSOs 106 that a user is interested to sell individually, in various sub-combinations, or as a set. For example, image 108 may include a picture of a user's living room, including a rug, couch, two end tables, a coffee table, and lamps that may be listed for sale together as an entire living room set, and/or separately as individual pieces on EM 112. Or, for example, the two end tables may be sold together as subset of FSOs 116. In an example embodiment, image 108 may include an image of two similar or identical end tables, and a quantity in the listing may be automatically set to two.

Mobile device 116 may include a mobile phone, laptop, gaming system, tablet, desktop, smart television, wearable, appliance or other computing device that is capable of taking pictures and/or video, and transmitting image(s) 108 to IE 102. In an embodiment, mobile device 116 may include a camera that is capable of capturing image 108. In an embodiment, mobile device 116 may be executing a web-based or local app that is connected to the cloud or other network of computers through which mobile device 116 sends and receives communications with IE 102, including image 108 and pricing information 104.

In an embodiment, IE 102 may receive image 108 and may automatically identify one or more FSOs 106 from image 106 through image recognition. To achieve this function, IE 102 may employ any well-known image recognition technique, process, module, apparatus, system, method, computer program product and/or technology. For example, IE 102 may compare image 108 to one or more images 118 from previously identified objects, objects currently listed for sale 120 on EM 112, previously sold objects 110 from EM 112, and/or third party databases, services or websites, to name just some examples. In an embodiment, IE 102 (or another matching system) may compare visual features of FSO 106 from image 108 to visual features of the other previously identified objects or images, including but not limited to images 118 from EM 112. Based on the comparison, IE 102 may receive or determine an identification 122 of FSO 106 from image 108.

In an embodiment, IE 102 may provide a request that a user confirm or correct the identification 122 of FSO 106. In an embodiment, IE 102 may also request from the user additional information regarding one or more features 124 or possible features of FSO 106. Example features 124 may include make, model, manufacturer, configuration, customization, color, serial number, condition indicators (e.g., poor, used, like new, new), geographic location, etc.

In an embodiment, IE 102 may identify multiple objects that may be visually similar to FSO 106. IE 102 may request from the user additional information about one or more features 124 of FSO 106 that may distinguish between different subsets of the objects to more accurately identify (122) FSO 106.

For example, IE 102 may identify FSO 106 as being a tablet computer. IE 102 may identify a set of visually similar tablet computers with the manufacturer or model from EM 112, and may request that the user provide additional information such as the amount of memory (e.g., 32 GB or 64 GB) or processing power of the FSO 106. This may enable IE 102 to more accurately identify which subset of visually similar objects from EM 112 corresponds to FSO 106 for pricing purposes. Also or alternatively, IE 102 may request that the user use the mobile device 116 to take a picture (that is, an image 108) of particular identifying information, such as a model number, bar code, clothing label, etc., from FSO 106. Embodiments for identifying objects that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

IE 122 may generate a price 104 for FSO 106 based on comparing identification 122 and features 124 (if any) of FSO 106 to listed and/or sold objects 110, 120 from EM 112. Price 104 may be a suggested or predicted price for which FSO 106 may sell on EM 112. IE 102 may first identify similar objects from EM 112 based on a the identification 122 and features 124 comparison. IE 102 may then request the pricing histories 128 for the similarly identified objects.

Based on this pricing history of similarly listed 120 and/or sold objects 110, IE 102 may generate an average, median, or range of prices 104 for FSO 106. For example, price 104 may include a range of prices for which similar objects 110 have sold in the previous 4 weeks, or 6 months (or any other period of interest), and may account for geographic location of sales, particularly for larger items for which shipping costs increase prices. IE 102 may communicate the generated price 104 back to the app of mobile device 116, in real-time, after receiving image 108, to thereby inform the user of a suggested price (by doing so, the user may be better informed as to whether or not to list the FSO 106 for sale on the EM 112).

In an embodiment, for both sold objects 110 and listed objects 120, EM 112 may include at least images 118, features 126, prices 128, and sell times. Images 118 may include user submitted images for listings. Features 126 may include user approved or otherwise determined features for object that are or have been listed, and may include product descriptions. In an embodiment, IE 102 may use images 118 and features 126 to identify items, products or objects from EM 112 that are similar to FSO 106.

EM 112 may also track a pricing history 128 and sell time 130. Pricing history 128 may include indications of when a user increased or decreased the price of an object during the course of listing. Sell time 130 may indicate how long a listing has been active, including when a listing was deactivated or reactivated, and how this may correspond to changes in the pricing 128. For example, EM 112 may track that a particular product was initially listed for $100, that after 3 days, it was discounted to $85, that after a week, a 15% increase was added, and that 2 weeks after it was initially listed, the product sold for $94.

In an embodiment, IE 102 may automatically generate a listing 114 (or partial listing) for FSO 106, without user request or involvement. Listing 114 may include a form that is used for submitting items for sale to EM 112. In an embodiment, IE 102 may include image(s) 108, generated price 104, indicated features 124, identification 122, a general description of FSO 106 based on identification 122 (or listings of previously sold objects 110), default or preferred shipping terms, etc. in listing 114 for FSO 106. A user may have the option of editing or customizing listing 114 as they see fit, including adding/removing features 124 or images 108 or editing the descriptions or price 104. IE 102 may submit listing 114 to EM 112 and FSO 106 may be included as one of the listed objects 120.

In an embodiment, IE 102 may enable a user to set a price alert 132 indicating a minimum price at which IE 102 takes an action on the user's behalf, such as submitting the listing 114 to EM 112. For example, IE 102 may set a price alert 132 and monitor the average, range, or latest sell or list prices 128 of sold objects 110 (or listed objects 120). In an embodiment, alert 132 may include the indication of a particular date/time, or time period when the user wants price updates or listing 114 to be posted to EM 112.

Based on alert 132, IE 102 may periodically transmit notifications or updates to a user's e-mail address, phone number, app, or other contact information associated with a user account 134. Based on new sales or listing from EM 112, IE 102 may generate new prices 104. The new prices may be compared against price alert 132. For example, when price alert 132 is met or exceeded, IE 102 may automatically post listing 114 to EM 112 and transmit a notification to mobile device 116, including a link to listing 114 (so that a user may view, edit, or cancel the listing) that the listing is active.

Listing 114 may be posted under a user account 134 associated with a user or mobile device 116. User account 134 may include information such as: payment, bank account, name geographic location, seller/buyer ratings, user ID, password, score information, shipping preferences, or other information about a user who is submitting FSO 106. In an embodiment, a user may see their listing and purchase history through accessing their user account 134 through a website or app on mobile device 116.

In an embodiment, IE 102 may continue tracking prices 128 (and demand 136) of sold objects 110 (similar to FSO 106) and periodically send updates to mobile device 116 or an e-mail address associated with user account 134 until an alert 134 or listing 114 is cancelled, or FSO 106 is sold.

When listing 114 is activated, deactivated, or FSO 106 is sold via EM 112, IE 102 may automatically discontinue the price update notifications.

In an embodiment, IE 102 may generate a demand indicator 136 for FSO 106. Demand indicator 136 may include one or more measures of an estimated demand or supply/demand ratio for FSO 106. In an embodiment, demand indicator 136 may indicate a median or range of sell times 130 for sold objects 110 at various price points. Demand indicator 136 may indicate how long currently listed objects 120 have been listed based on their accumulating sell time 130. Also or alternatively, IE 102 may generate a sellability score and/or a cancellability score for FSO 106. Sellability score is a measure of how likely the FSO 106 is likely to sell on the EM 112, based on the strength of the associated listing and/or other factors. Cancellability score is a measure of how likely the listing of the FSO 106 will be cancelled by either the seller or the buyer, based on the seller's history and/or other factors. Embodiments for generating a sellability score and a cancellability score are described in U.S. patent application Ser. No. 16/288,158 titled "Determining Sellability Score and Cancellability Score", that was referenced above, and that is herein incorporated by reference in its entirety, and IE 102 may employ any of these incorporated embodiments (individually or in any combination with the teachings of this disclosure) to achieve the functions described herein.

In an embodiment, EM 112 may track search requests 138 for different objects or categories of objects. For example, EM 112 may track how many or how often search requests 138 are received for objects that are similar to FSO 106. IE 102 may determine whether the frequency of search requests 128 is increasing, decreasing, staying the same relative to a historical average or previous searches. In an embodiment, IE 102 may account for search request 138 information in generating demand indicator 136.

In an embodiment, demand indicator 136 may include a score (e.g., within a range of 1-10) that incorporates various weighted or un-weighted factors to determine a demand for FSO 106. Demand indicator 136 may include an indication of a price, purchase, or listing trend with regard to objects similar to FSO 106. IE 102 may provide notifications of demand indicator 136 changes to mobile device 136, similar to price 104 as described herein. In an embodiment, the periodic notifications and/or alert 132 may correspond to price 104 and/or demand indicator 136.

Figure 2:
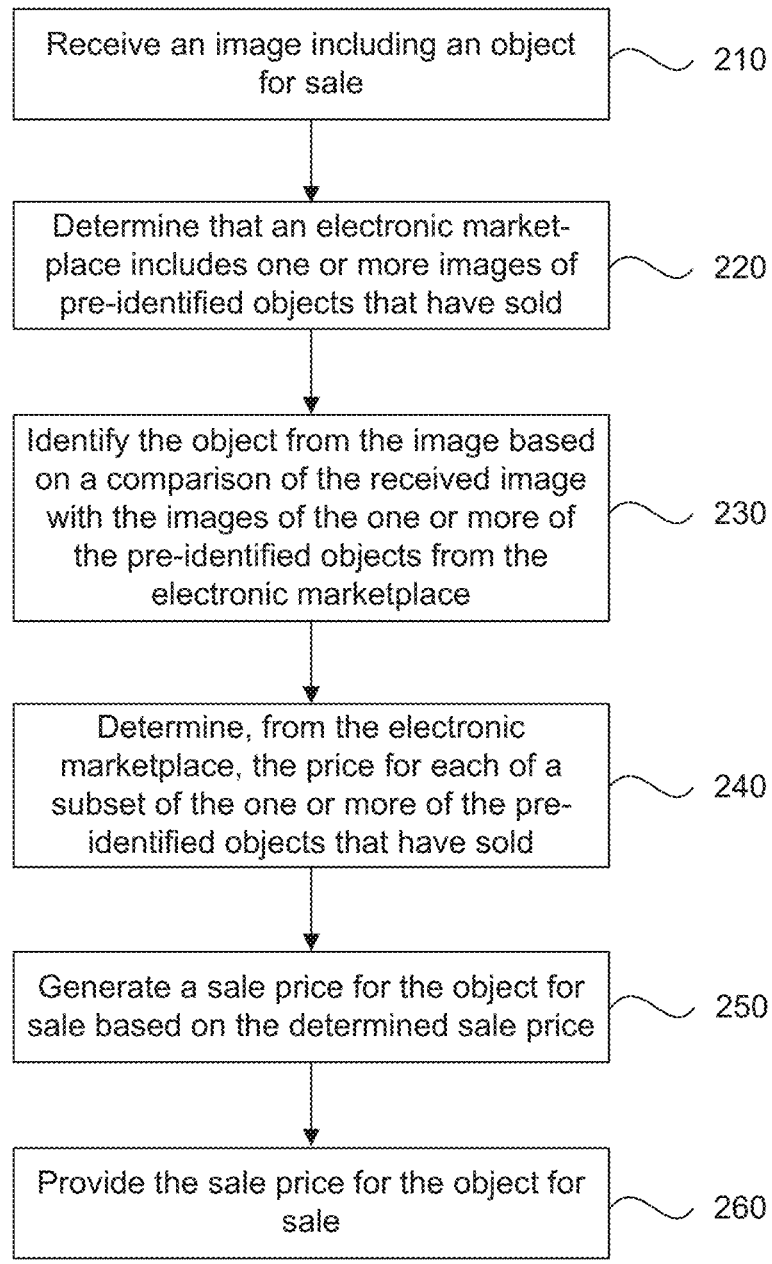
FIG. 2 is a flowchart illustrating operations of an example inventory ingestion engine and pricing system that identifies and prices for sale objects from images, according to some embodiments.

FIG. 2 is a flowchart 200 illustrating operations of an example inventory ingestion engine and pricing system that identifies and prices for sale objects from images, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, an image including an object for sale is received. For example, IE 102 may receive image 108 from mobile device 116. Image 108 may include multiple images of the same object 106, or different objects 106. The different objects 106 may be unrelated, or they may be from a collection or set of objects. In an embodiment, image 108 may include video or other multimedia of one or more FSOs 106. The following steps are performed for each of the FSOs 106 in the image 108.

In 220, for an FSO 106 in the image 108 (called the current FSO 106), it is determined that an electronic marketplace includes one or more images and/or other information of pre-identified objects that have sold. For example, EM 112 may include listings of objects that are currently listed or were previously listed for sale 120, including objects that have sold 110. EM 112 may maintain or store information such as images 118, feature and description 126, price 128, sell time 130 information, etc., for these current, expired, active, deactivated, and sold listings of objects 110, 120. As noted above, the pre-identified objects are ones that are the same or similar to the current FSO 106. Embodiments for identifying objects that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

In 230, the object from the image is identified using image recognition technology based on, for example, a comparison of the received image with the images of the pre-identified objects from the electronic marketplace. For example, IE 102 may compare image 108 with images 118 of objects 110, 120 from EM 112. Based on an image 108, 118 comparison, IE 102 may identify the current FSO 106 without user input or description. In an embodiment, the identification 122 may be determined by an external system including both images 118 from EM 112, and images from one or more other databases or systems of previously identified objects. In another embodiment, the object from image 108 may also be identified from images that are not retrieved from EM 112.

In 240, the price for each of a subset of the one or more of the pre-identified objects that have sold is determined from the marketplace. For example, IE 102 may determine prices 128 for the sold objects 110 from EM 112 that are the same or similar to the current FSO 106. In an embodiment, IE 102 may request feature information 124 about the current FSO 106. Then, for example, based at least in part on a feature 124, 126, IE 102 may identify or request pricing information 128 for similarly sold and/or listed objects 110, 120 from EM 112.

In 250, a sale price for the object for sale is generated based on the determined prices. For example, from the determined prices 128 of sold objects 110 (and/or listed objects 12) that are the same or similar to the current FSO 106, IE 102 may generate a price 104 for the current FSO 106. Price 104 may include a suggested price, a predicted sale price, a range of prices for which similar objects have sold, and/or a pricing history of similarly listed and/or sold objects from EM 112 that are the same or similar (in both image 118 and/or features 126) to the current FSO 106. In an embodiment, IE 102 may take a range of prices from the sold objects 110 and use a median or average price (of the range of prices) as a recommended sales price.

In 260, the sale price for the object for sale is provided. For example, IE 102 may provide price 104 to mobile device 116, or include price in a pre-generated listing 114 for the current FSO 106 on EM 112. In an embodiment, IE 102 may continue providing price updates for the current FSO 106 based on alert(s) 132, until a listing 114 has been activated, deactivated, or FSO 106 has sold.

In some embodiments, steps 220-260 may be repeated for each of the FSOs 106 contained in the image 108 obtained in step 210. In this manner, listings and pricing information may be quickly, easily, and automatically generated for items contained in the user's house, such as the living room, garage, basement, office, hobby room, backyard, etc., or any other location.

Automatic Inventory Ingestion Based on Analyzing Emails

Figure 3:
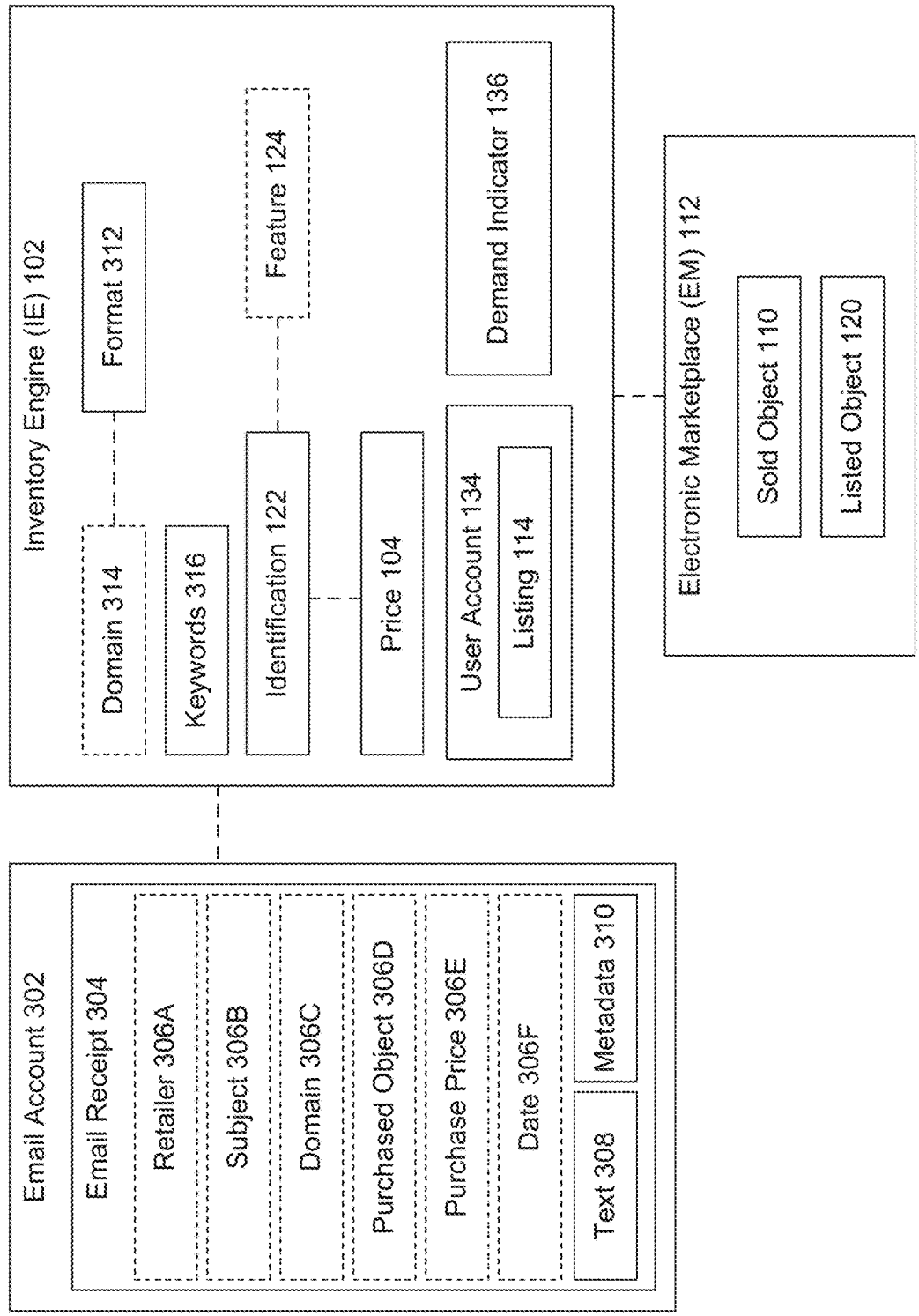
FIG. 3 is a block diagram illustrating an example inventory ingestion engine and pricing system that identifies and prices for sale objects from emails (such as email receipts), according to some embodiments.

FIG. 3 is a block diagram 300 illustrating an example inventory ingestion engine and pricing system that identifies and prices for sale objects from email (such as email receipts), according to some embodiments. System 300 may simplify the process of listing products for sale on EM 112, and may perform pricing and demand determination functionality similar to what is described above with respect to system 100 as described in reference to FIGS. 1-2.

In an embodiment, IE 102 may scan a user's e-mail account 302 or inbox and identify various e-mails or messages that may be receipts 304 for the purchase of various items and objects from one or more retailers. The e-mail receipt 304 may be an electronic message (e.g., email, webpage, etc.) that may include purchase information 306 about purchase of an item, such as retailer 306A, subject 306B, domain 306C, purchased object 306D, purchase price 306E, and date 306F.

In an embodiment, email receipt 304 may be any electronic message from a retailer or a payment service that collected and/or distributed payments on behalf of a user and/or retailer. Retailer information 306A may include a name, physical address, web address, or other identifying information about the person or company from whom an item, product, or object was purchased. An electronic message 304 may include a subject area 306B that indicates it is a receipt or includes other information identifying the contents of the e-mail.

Domain 306C may indicate a web address or host associated with the purchased item or from whom the email receipt or electronic message 304 was received. In an embodiment, domain 306C may indicate an electronic payment service that paid retailer 306A on behalf of a user for the purchase of an item. Purchased object 306D may include a description, features (124), condition, and/or identification 122 of what item(s) were purchased. Purchase price 306E may indicate the price at which the product was purchased, and a date 306F may be a date of shipment or purchase 306F.

Purchase information 306 may be included in text 308 and/or metadata 310 of the e-mail receipt 304. Text 308 may be included the body of the e-mail receipt as it appears (and is readable or visible) to in a user's inbox, e-mail account, app, or mobile device. Metadata 310 may include information about e-mail receipt 304 and may include information that is or is not visible in text 308. While not visible to a user, metadata 310 may be accessible to applications such as apps (including an IE 102 app on a mobile device 116), or a browser.

In an embodiment, IE 102 may include a repository of one or more known formats 3012 of e-mail receipts 304 as they correspond to different retailers 306A or domain 306C, referred to collectively as domain 314. Format 312 may include a pre-determined, pre-discovered, or otherwise known configuration of purchase data 306 within text 308 and/or metadata 310 of a particular e-mail receipt 304 associated with a particular company, domain, or retailer 306A.

For example, a particular retailer 306A may send out a similarly formatted messages or e-mail receipts 304 to different customers purchasing items from their website. IE 102 may determine an e-mail receipt 304 from the retailer 306A or domain 306C, and retrieve format 312 from a database or repository. Using format 312, IE 102 may more quickly identify and retrieve purchase information 306 from e-mail receipt 304, by identifying already known keywords 316 from text 308 or metadata 310 that indicate various purchase information 306.

In an embodiment, IE 102 may scan an user's e-mail inbox for domains 306C or retailers 306A that correspond to a domain 314. IE 102 may then use format 312 to process the e-mail receipt 304 for known domains 314, which consumes fewer processing resources than having to perform full text and/or metadata searches for purchase information 306 from receipts 304. In an embodiment, domain 314 may include subject line 306B information as well, to distinguish between purchases and returns originating from the same retailer 306A or domain 306B.

Maintaining and using the list of domains 314 for which known format 312 have been identified, may save processing and memory resources in more quickly identifying e-mail receipts 304 from normal non-receipt e-mails or messages. Processing using format 312 may also save additional information in extracting or determining purchase information 306 from an identified e-mail receipt 304. For example, if there are no known formats 312, then a system would have to perform a full text scan of the same e-mails in the same formats repeatedly to both identify a potential e-mail receipt 304 and to extract information from an e-mail receipt. This may require and performing numerous text comparisons to identify which information is or is not present in the text 308 and/or metadata 310 of a particular e-mail.

If no corresponding format 312 exists for a particular domain 306C or retailer 306A, then IE 102 may scan text 308 and/or metadata 310 for one or more keywords 316 to determine whether or not the e-mail is an e-mail receipt 304. Keywords 316 may include one or more words or phrases that are commonly associated with e-mail receipts 304 and purchase information 306.

For example, IE 102 my scan the subject 306B for keywords 316 such as: receipt, purchase, buying, order, shipping, or congratulations—any of which may indicate that a message is an e-mail receipt 304. If, for example, one of these keyword 316 is identified in the subject line 306B (or text 308) of an e-mail or message, then IE 102 may determine that the message is an e-mail receipt 304 that pertains to the purchase of an item or product.

IE 102 may scan the text 308 of the e-mail message 304, for other keywords 316 corresponding to other purchase information 306. For example, "$" may indicate a purchase price 306E. Or, for example, keywords such as: computer, tablet, memory, laptop, monitor, shoes, jeans, shirt, may indicate various object 306D that were purchased. IE 102 may identify a group of characters in a date format 306F (e.g., MM/DD/YYYY) or identify a date of the e-mail receipt 304 from metadata 310.

In an embodiment, IE 102 may record or track the retailer 306A, subject 306B, and/or domain 306C information to generate formats for newly discovered domains 314. Using machine learning, IE 102 may generate and compile a growing list of domains 314 and formats 312.

Using the purchase information 306 extracted from the text 308 and/or metadata 310 of an e-mail receipt 304, IE 102 may identify 122 a purchased object 306D. IE 102 may identify sold and/or listed objects 110, 120 that are the same or similar to the identification 122 to generate a price 104 and/or demand indicator 136 for the purchased object 306D corresponding to the identification 122, as described above. Embodiments for identifying the same or similar items are described above.

IE 102 may use the extracted purchase information 306, and information from EM 112, to fill in a pre-configured shell for listing 114, and enable the user to post the listing 114 to resell purchased object 306D at the recommended or specified price 104, or at any other price desired by the user. As described above, IE 102 may also enable alerts 132 to be set that monitor and update a price 104 as items or objects are listed and/or sold on EM 112.

In an embodiment, IE 102 may periodically scan a user's inbox for new purchases, tracking which previous e-mails were already scanned, without having to scan them again. For example, IE 102 may record or store (in user account information 134) a date/time of the last or most recently received message that was processed from e-mail account 302. Then, for example, during a subsequent processing, IE 102 may only process those messages that were received after the stored date/time. In another embodiment, a user may forward or submit an e-mail receipt 304 to IE 102 and receive in return an estimated or projected price 104, listing 114, and an option to resell purchased product on EM 112 without IE 102 performing a full or partial e-mail account 302.

Figure 4:
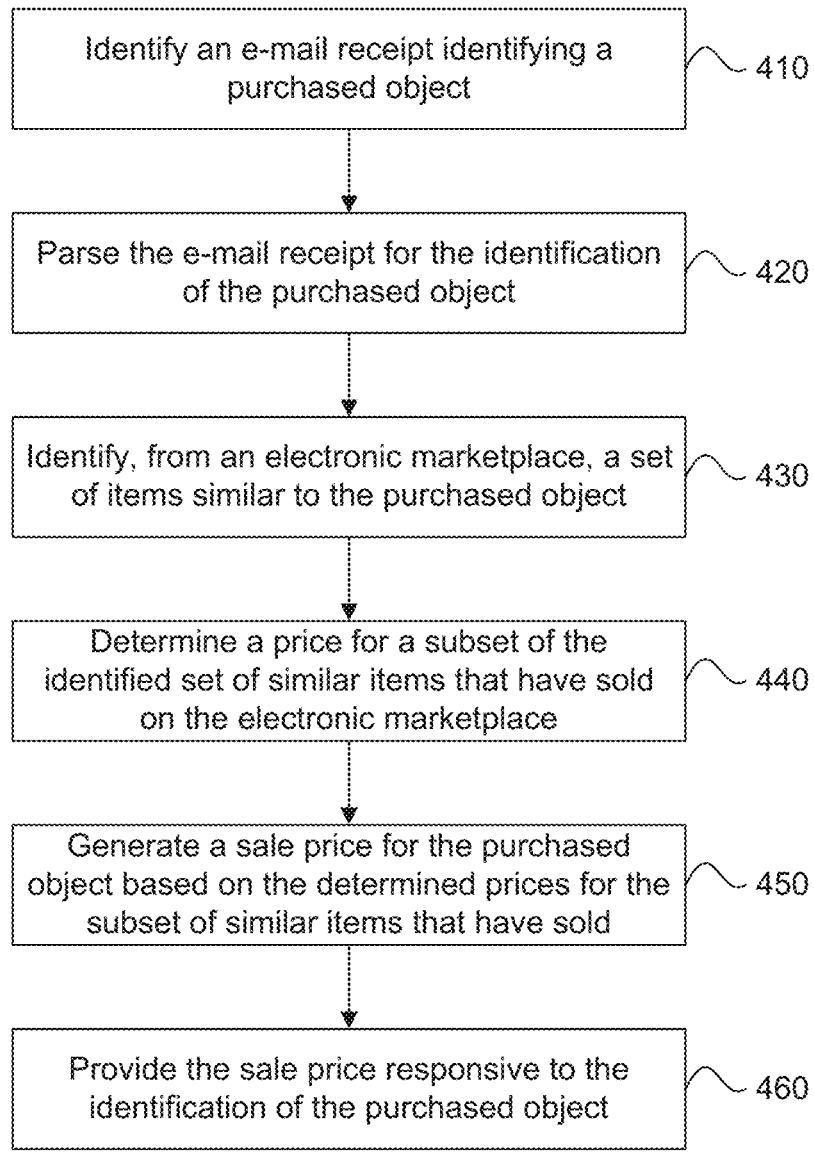
FIG. 4 is a flowchart illustrating operations of an example inventory ingestion engine and pricing system that identifies and prices for sale objects from emails, according to some embodiments.

FIG. 4 is a flowchart 400 illustrating operations of an example inventory ingestion engine and pricing system that identifies and prices for sale objects from email receipts, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to the example embodiments.

In 410, an e-mail receipt identifying a purchased object is identified. IE 102 may receive authorization from a user to access the user's e-mail account, including the user's ID and password for access. IE 102 may access the user's email server or provider using any well-known methods, techniques, technologies, systems, processes, etc., existing now or developed in the future. Then, IE 102 may scan metadata 310 or a subject line 306B information from the e-mails to determine whether the message is an e-mail receipt 304. The e-mail receipt 304 may include a message that identifies a product that was purchased from a retailer 306A.

In an embodiment, IE 102 may determine whether the e-mail receipt 304 is received from or otherwise associated with a known domain 314. In an embodiment, the messages may include messages from a social media account. If IE 102 determines that the e-mail receipt 304 corresponds to a domain 314, then format 312 may be used to extract purchase information 306 (including identifying purchased object 306D) from e-mail receipt 304.

In an embodiment, IE 102 may maintain a history or repository of email or receipt templates regarding a particular domain 314. Then, IE 102 may cross-reference the date associated with a particular e-mail, to identify a specific template corresponding to the domain 314 for the email. The template may identify where the metadata 310 is located and/or how it is arranged.

If, however, no domain 314 match exists. IE 102 may determine whether the message is an e-mail receipt 304 or just a regular non-receipt message. In an example, IE 102 may scan the subject 306D for keywords 316 indicating it may be a receipt, such as: receipt, purchase, congratulations, shipping, etc. If a receipt is identified, then IE 102 may scan the remaining text 308 and/or metadata to extract purchase information 306 based on one or more additional keywords 316.

Or, for example, IE 102 may perform a domain lookup to identify whether a domain associated with the e-mail corresponds to a previously identified or known e-commerce website. If the domain is associated with an e-commerce website, then IE 102 may parse the subject or metadata of the e-mail for price and other receipt information.

In 420, the e-mail receipt is parsed for an identification of the purchased object. For example, if email receipt 304 corresponds to a known domain 314, IE 102 may determine purchased object information 306D based on a known format 312 of e-mail receipt 304. Or, for example, IE 102 may scan the text 308 of e-mail receipt for keywords 316 commonly associated with a purchased object 306D such as: description, item, model number, serial number, computer, pants, boots, size, shirt, or different known manufacturers (e.g., Apple, Samsung, Kenneth Cole, etc.).

In 430, a set of items that are the same or similar to the purchased object are identified from an electronic marketplace. For example, IE 102 may determine an identification 122 of the item or product purchased from purchase information 306 extracted from e-mail receipt 304. As described above, IE 102 may identify listed objects 120 and/or sold objects 110 from EM 112 that are similar to identification 122 and features 124. Embodiments for identifying objects that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

In an embodiment, IE 102 may request additional information from a user confirming identification 122 and/or features 124. The user may change, add, or remove identification 122 or features 124. IE 102 may then identify similar objects from EM 112.

In 440, a price for each of a subset of the identified set of similar items that have sold on the electronic marketplace is determined. For example, IE 102 may determine which objects from EM 112 most closely resemble identification 112 and features 124 or purchased object 306D. IE 102 may request the pricing history 128 for those objects, which may include the price for which the objects 110 actually sold on EM 112

In 450, a sale price for the purchased object is generated based on the determined prices for the subset of similar items that have sold. For example, IE 102 may select a subset of all the sold objects 110 that are similar to purchased object 306D (e.g., ten objects) and generate a sales price 104. The subset may include the most recently sold, the highest priced, the lowest priced, or random selections of objects from which to generate sales price 104.

For example, if 100 similar cameras 110 may have sold in the previous 3 months, with identical features 124 to purchased object 306D, IE 102 may randomly select 15 of the cameras and use those prices to generate price 104. In an embodiment, IE 102 may determine a pricing trend (increasing, decreasing, flat) from the previous sales, and provide this with price 104. In an embodiment, IE 102 may account for the listed prices of objects 120 as well in generating price 104.

In 460, the price is provided responsive to the identifying. For example, IE 102 may send a text or e-mail to the user identifying the purchased object 306D, e-mail receipt 304, and generated price 104. In an embodiment, IE 102 may also provide demand indicator 136 information as well, which may include a demand or searching trend. IE 102 may automatically generate a listing 114 for purchased object 306D on EM 112, and may submit listing 114 upon a user request or a price alert 132.

Automatic Inventory Ingestion Based on Analyzing Retailer Websites

Figure 5:
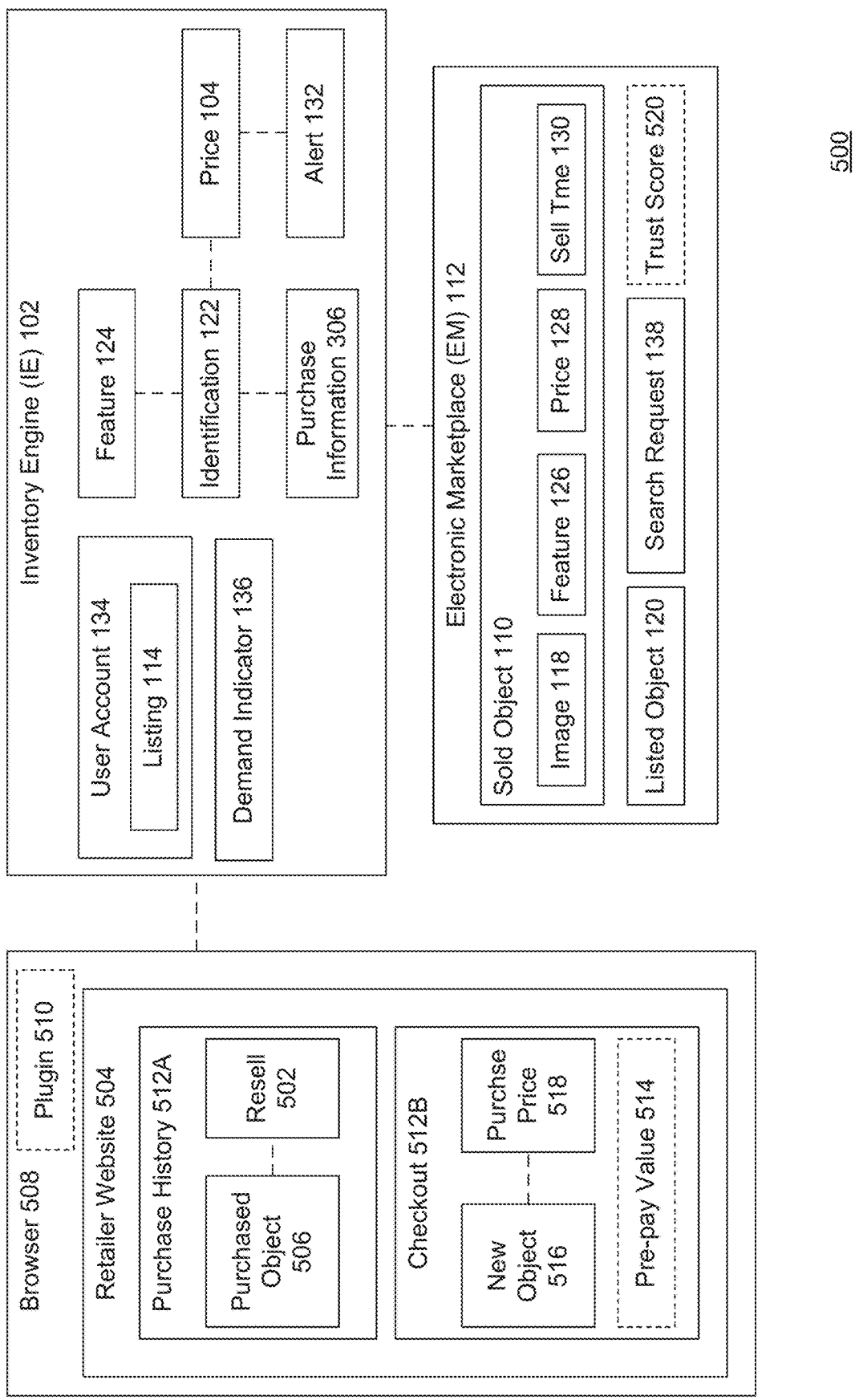
FIG. 5 is a block diagram illustrating an example inventory ingestion engine and pricing system that identifies and prices for sale objects from a retailer or other website, according to some embodiments.

FIG. 5 is a block diagram 500 illustrating an example inventory ingestion engine and pricing system that identifies and prices for sale objects from a retailer website, according to some embodiments. System 500 may simplify the process of listing products for sale on EM 112, and may perform pricing and demand determination functionality similar to what is described above with respect to systems 100 and 300 as described in reference to FIGS. 1 and 3.

In an embodiment, a user may be viewing or accessing a retailer website 504 (such as AMAZON, EBAY, TARGET, WAYFAIR, etc.) using a browser 508. Browser 508 may include a web browser or other app or application configured to operate on a mobile or other computing device that enables a user to view retailer website 504. For example, browser may include an app associated with a particular retailer that is operating on a mobile device 116. Retailer website 504 may include an electronic portal from which a user can purchase, has purchased, or can see previously purchased products (e.g., purchased object 506) from a retailer.

In an embodiment, plugin 510 may be a program that operates in conjunction or simultaneous with or as a part of browser 508. In an embodiment, plugin 510 may be downloaded and installed and operate in the background while browser 508 is operating. Plugin 510 may be configured or authorized (by a user) to display pop-ups or other notifications to user, and/or receive information about user's activity from browser 508 and/or on retailer website 504, including purchase history 512A and other user account information.

In an embodiment, browser 508 may include or be configured with a plug-in (or other application) 510 that monitors a user's activity on browser 508 or on a particular website 504. For example, plugin 510 may monitor which websites (e.g., 504) and/or webpages 512 a user visits or requests.

In an embodiment, IE 102 (via plugin 510) may have authorized access to a purchase history webpage 512A of retailer website 504. Purchase history 512A may include a webpage or screen in which retailer website 504 may provide information about one or more previous items or objects 506 that were viewed and/or purchased from or through retailer website 504. In an embodiment, retailer website 504 may either sell products or items directly to a consumer or user, or may handle financial transactions related to the purchase or sale of items (e.g., purchased objects 506). In an embodiment, purchase history 512A may include items or purchased objects 506 that were purchased from kiosks or store locations associated with a particular retailer, in addition or alternatively to purchased objects 506 from retailer website 504.

In an embodiment, plugin 510 may generate or display, via browser 508, a resell button 502 for each previously purchased object 506 listed in purchase history page 512A. For example, if purchase history 512A includes five purchased objects 506, plugin 510 may generate a resell button 502 next to each purchased object 506 that is eligible for resale through EM 112. In an embodiment, certain items or purchases may be prohibited from being resold on EM 112 (e.g., such services, downloaded electronic media (e.g., such as music files, electronic books, computer programs), or items with profanity or nudity).

In an embodiment, IE 102 may receive a notification when a user presses or otherwise selects a resell button 502 on a page 512 of a retailer website 504. The notification may include purchase information 306 (e.g. of FIG. 3) about the corresponding purchased object 506 from the retailer website 504. IE 102 may determine an identification 122 and features 124 of the purchased object 506 based on this purchase information 306. For example, the purchase information 306 may include manufacturer, model, images, serial number, size, color, or other information that may enable IE 102 to identify purchased object 506.

As discussed above, IE 102 may perform an identification 122 and features 124 comparison to identify similarly listed 120 and sold objects 110 in EM 12, retrieve price information 128, and generate a price 104 for purchased object 506. Upon a user request or later based on an alert 132, IE 102 may generate and submit a listing 114 for the purchased object 506 on EM 112.

In an embodiment, the resell button 502 may be any visual indicator or icon that indicates a purchased object 506 may be eligible for resale on EM 112. In an embodiment, resell button 502 may include the generated or estimated resell price 104 (or range of prices) for a particular purchased object 506. In an embodiment, purchase history 512A may include a resell all button that enables a user to resell all the items eligible for resale on EM 112 from purchase history 512A. The resell all button may include a price or range of prices 104 for selling all the eligible items of purchase history 512A. In an embodiment, plugin 510 may enable a user to select or deselect a collection or set of objects 506 to be sold on EM 112, individually or as a set/collection.

Or, for example, plugin 510 may enable a user to select a subset of items to be resold individually and/or as a collection of items on EM 112. For example, two matching nightstands may be sold as a collection, whereby both must be purchased in the same transaction or are offered on the same listing 114 on EM 112.

In an embodiment, plugin 501 may generate price 104 (e.g., via resell button 502) without receiving a request from a user to check the price. For example, IE 102 may scan the purchase history information 512A associated with a user account, and identify and price the objects 506 available for resale. IE 102, via plugin 510, may similarly indicate that certain purchased objects 506 are not eligible for resale, or listing 114 and pricing information must be determined manually.

In an embodiment, IE 102 may generate a pre-pay value 514. Pre-pay value 514 may include a monetary price, tokens, credits, or discounts that may be transferred or applied to a user account 134 at a time of listing 114 or prior to purchased object 506 actually being sold on EM 112. Pre-pay value 514 may provide a user an additional incentive for reselling the purchased object 506 on EM 112.

In an embodiment, a user may be purchasing a new item or object 516 from retailer website 504, which may include a listed purchase price 518. In an embodiment, EM 112 and retailer website 504 may include a partnership, relationship, or arrangement, such that pre-pay value 514 may be offered as a credit or discount on a pending purchase from a checkout page 512B of retailer website 504.

For example, plugin 510 may detect that a user is on checkout page 512B of retailer website 504. IE 102 (via plugin 510) may provide a notification that if one or more purchased objects 506 (from purchase history 512A) were listed for resale, user may receive the generated price 104, or that pre-pay value 514 may be applied as a credit or discount on the pending purchase of new object 516.

For example, a user may be purchasing a new laptop for $1000 on checkout page 512B. However, the user may have previously purchased a laptop (or any other item, such as shoes, a camera, etc.) for $750. IE 102 may determine that the resell price of the old laptop is now $500. IE 102 may further compute or generate a pre-pay value of $375 for listing the older laptop on EM 112 (and maintaining the listing 114 through a sale, otherwise the $375 may be credited back to the user account 134 of a user).

Then, for example, a user may purchase the new laptop for $1000-375=$625. The user account 134 may later be credited for any money greater than $375 for which the laptop sells on EM 112. If, however, the user sells the old laptop for $300, the user account 134 may be charged $75. In an embodiment, IE 102 may generate pre-pay value 514 based on a number of different factors such as the estimated resale price 104, demand indicator 136, and a trust score 520 associated with user account 134 to determine pre-pay value 514.

Trust score 520 may be a user's rating on EM 112, and may include factors such as the condition of previously sold products, a timeliness of shipment of sold products or payment for purchases, and other factors. In an embodiment, a user with a higher trust score 520 may be provided a higher pre-pay value 514 relative to a user with a lower trust score 520 or history of transactions on EM 112. In an embodiment, trust score 520 may include an indication of how much money is available in a user account or current balance.

Figure 6:
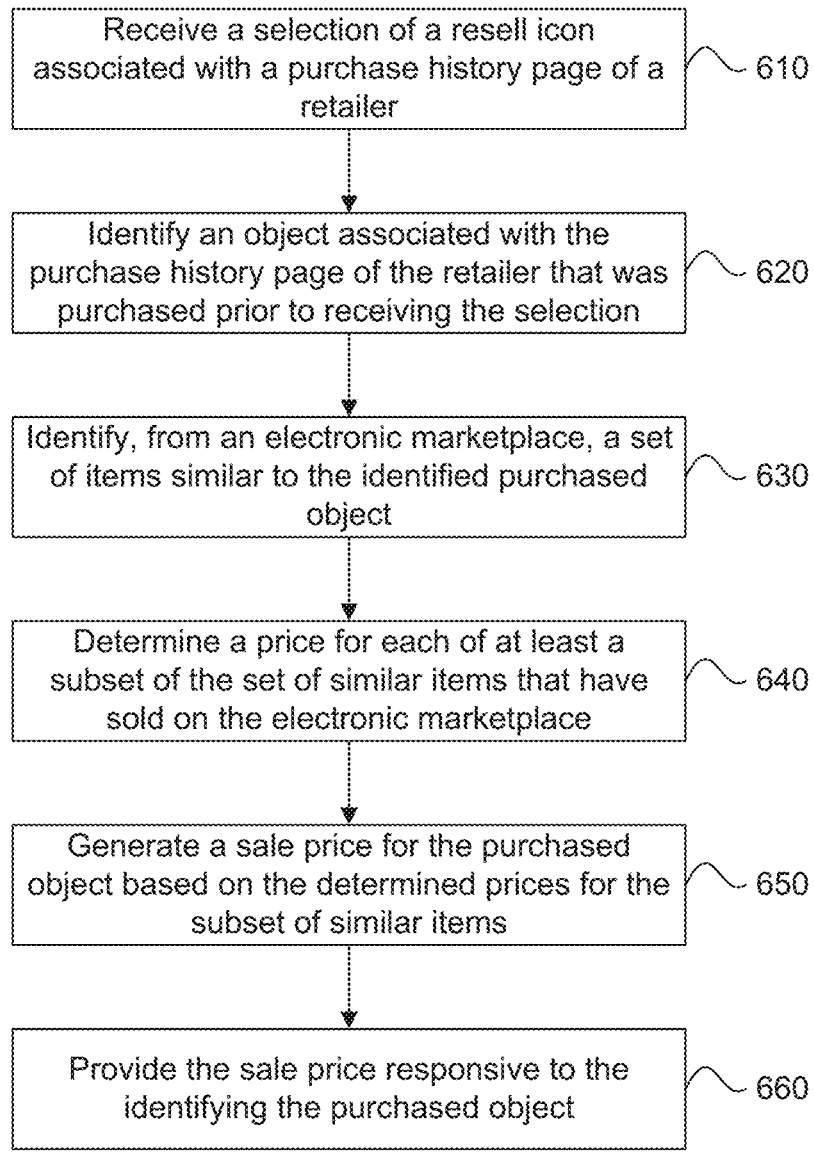
FIG. 6 is a flowchart illustrating operations of an example inventory ingestion engine and pricing system that identifies and prices for sale objects from a retailer website, according to some embodiments.

FIG. 6 is a flowchart 600 illustrating operations of an example inventory ingestion engine and pricing system that identifies and prices for sale objects from a retailer website, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 5. However, method 600 is not limited to the example embodiments.

In 610, a selection of a resell icon associated with a purchase history page of a retailer is received. For example, IE 102 may receive a selection of resell icon 502 from a purchase history page 512A of retailer website 504. Retailer website 504 may include a website viewable in a web browser 508 and/or via an app on a mobile device 116.

In an embodiment, IE 102 may retrieve the purchase history information from retailer website 504, and identify 122 purchased objects 506 and prices 104 associated with the selected resell icon and based on EM 112. Plugin 510 may monitor which websites a user browses (using browser 508). When a user requests purchase history page 512A, plugin 510 may generate, provide, or indicate that a resell icon 502 is to be displayed next to one or more purchased objects 506 (that may have been previously identified and priced by IE 102).

In 620, an object associated with the purchase history of the retailer that was purchased prior to receiving the selection is identified. For example, IE 102 may receive a notification indicating which purchased object(s) 506 from purchase history 512A a user wants to sell on EM 112. IE 102 may identify any unidentified objects 506, or may update the pricing (if needed) for any previously identified and priced objects 506.

In 630, a set of items that are the same or similar to the identified purchased object is identified from an electronic marketplace. For example, IE 102 may identify sold objects 110 from EM 112 that are similar to purchased object 506. The similarity may include visually similar objects, objects from the same manufacturer, model, or the same category of products. The sold objects 110, from EM 112, may include images 118 and features 126 that are similar to purchased object 506. This may include identifying any newly sold objects 110 that were not accounted for in a previous pricing model 104. Embodiments for identifying objects that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

In 640, a price for each of at least a subset of the set of similar items that have sold is determined from the electronic marketplace. For example, IE 102 may determine a price 128 for the sold objects 110 that are similar to purchased object 506. This may include performing a feature comparison between features 124 of purchased object 506 and features 126 of sold objects 110.

In 650, a sale price for the purchased object is generated based on the determined prices of the subset. For example, as described above, IE 102 may generate a resale price 104 for purchased object 506. The resale price 104 may include a guaranteed sale price, a projected price, or a range of prices, and may account for a user's trust score 520 on EM 112. In an embodiment, a higher trust score 520 may result in a higher projected price 104.

In 660, the sale price is provided responsive to the identifying the purchased object. For example, the price 104 may be provided to a user via browser 508 as a pop-up, or as a notification on purchase history page 512A. In an embodiment, price 104 may be provided on a checkout page 512B of retailer website, and may be deducted (at least in part) from the purchase price 518 of a new object 516 as pre-pay value 514, thus effectively providing a user a discount on a new object in exchange for selling purchased object 506 on EM 112.

Providing Market Descriptors About Pricing for Objects

Figure 7:
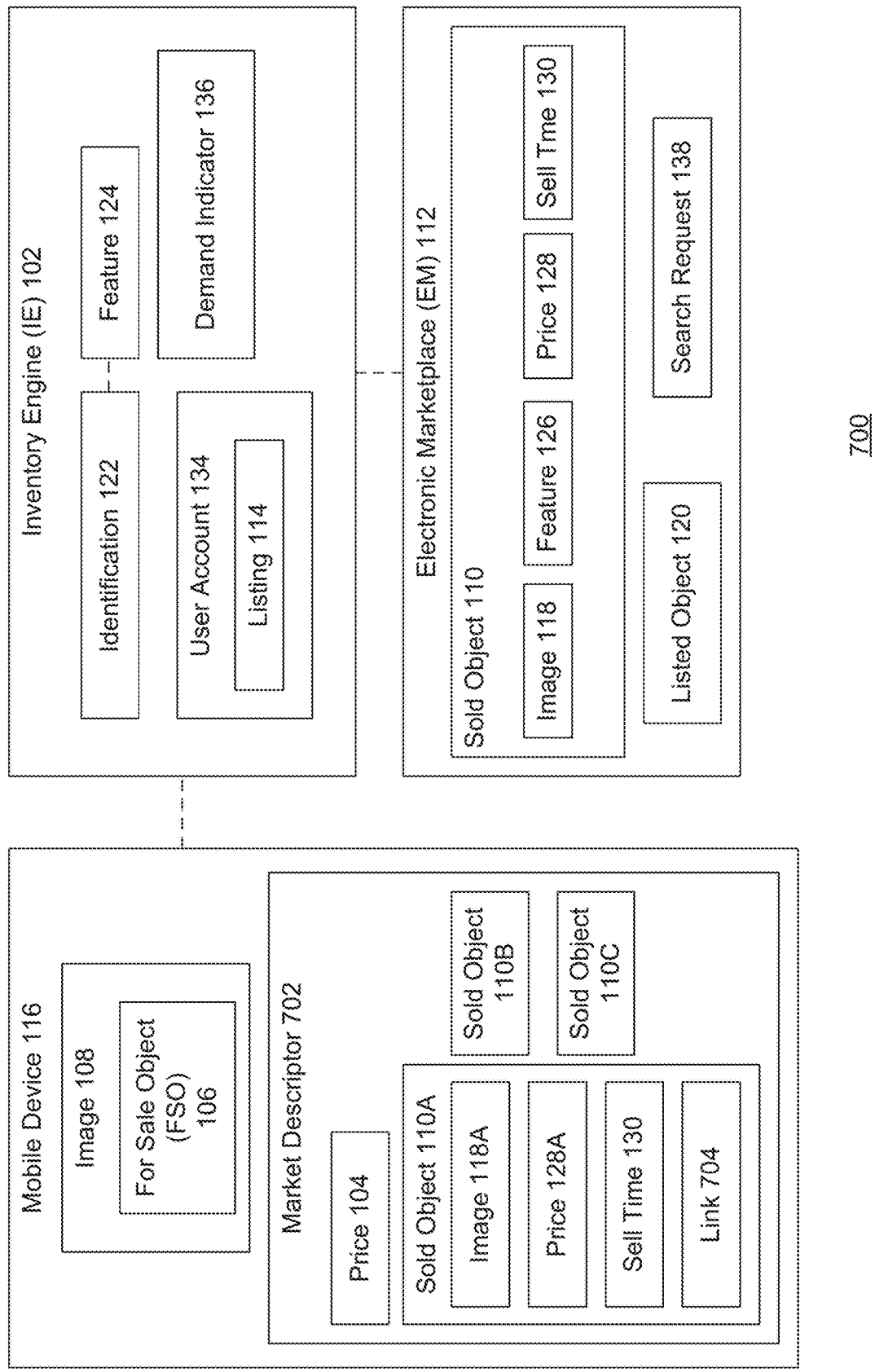
FIG. 7 is a block diagram illustrating an example inventory ingestion engine and pricing system that identifies and prices for sale objects and provides market descriptors about the pricing, according to some embodiments.

FIG. 7 is a block diagram 700 illustrating an example inventory ingestion engine and pricing system that identifies and prices for sale objects, and provides market descriptors about the pricing, according to some embodiments. System 700 may simplify the process of listing products for sale on EM 112, and may perform pricing and demand determination functionality similar to what is described above with respect to systems 100, 300, and 500 as described in reference to FIGS. 1, 3, and 5.

In an embodiment, IE 102 may generate a market descriptor 702 that provides detailed information or context about the existing market for an FSO 106 on EM 112. Rather than just providing a projected or estimated resale price 104 for FSO 106, market descriptor 702 may include additional information from actual sales that have occurred on EM 112, regarding sold objects 110A, 110B, 110C that are similar to FSO 106 based on image 108 or feature information (including descriptions) 124 comparisons.

In an embodiment, market descriptor 702 may include images of a selection of sold objects 110 that are identified as being similar to FSO 106. The selected objects of market descriptor 702, may include the most recently sold objects 110, the highest priced objects 110, the objects 110 that are most similar to FSO 106 (in image 118A or features 124), the objects 110 are similarly geographically located, etc. In another embodiment, market descriptor 702 may include listed objects 120 in addition or alternatively to sold objects 110A-C. In an embodiment, the sold objects 110A-C from market descriptor 702 may have been used to generate price 104.

The sold objects (or listed objects) 110A-C of market descriptor may include images 118A, price 128A, sell times 130, and links 704. Image 118A may include one or more images from EM 112 from a listing 114 of the sold object 110A. Price 128A may include a sold price, or may include a range of prices for which the object has been or is currently listed. Sell time 130 may include a date of sale or how long the object is/was listed prior to be sold.

In an embodiment, market descriptor 702 may include a link 704 to a listing 114 corresponding to the sold object 110A in EM 112. For example, by clicking link 704 or entering the address of link 704 in a browser, a user may see the actual listing of the object on EM 112. In an embodiment, link 704 may route a user to a list or listings 114 of the sold objects 110 and/or listed objects 120 that were accounted for in generating price 104.

Figure 8:
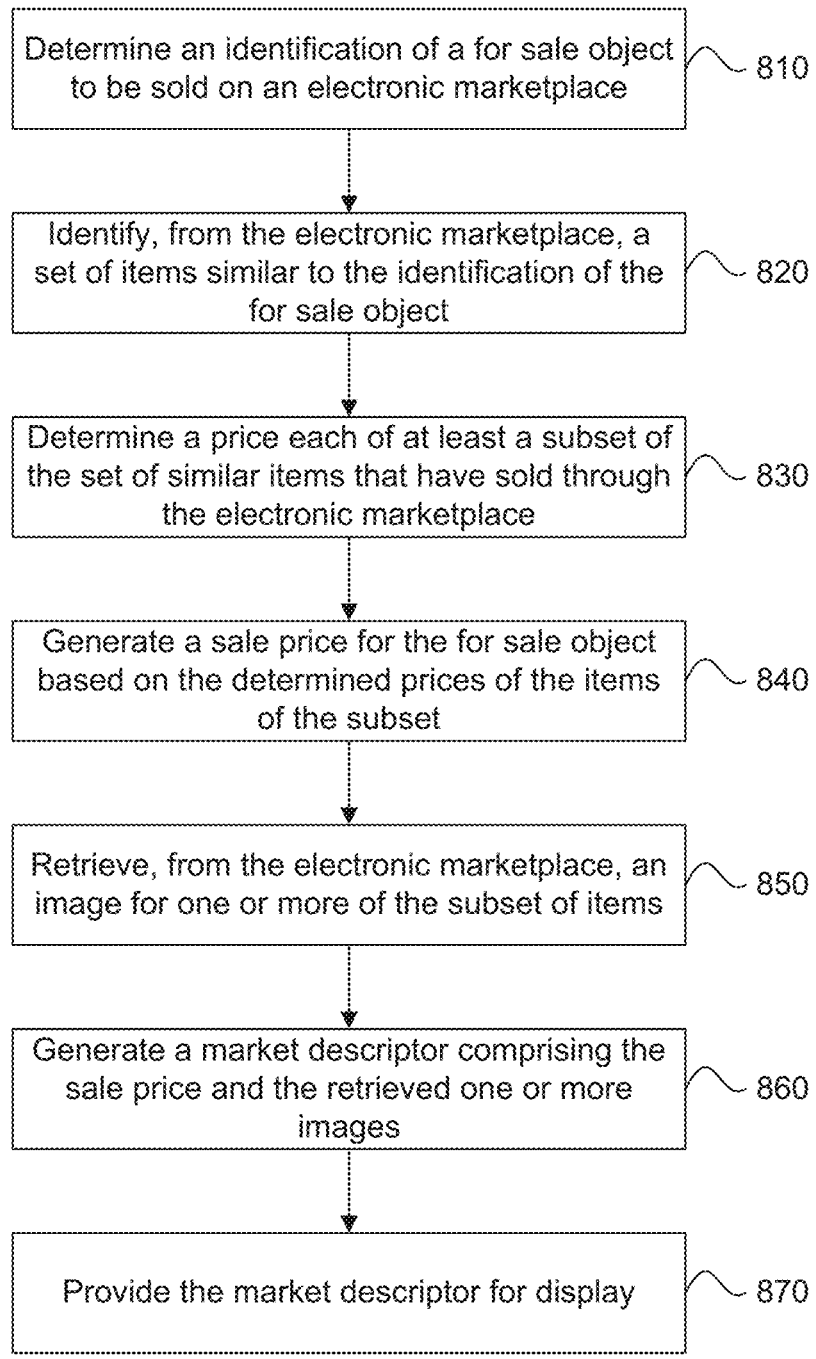
FIG. 8 is a flowchart illustrating operations of an example inventory ingestion engine and pricing system that identifies and prices for sale objects and provides market descriptors about the pricing, according to some embodiments.

FIG. 8 is a flowchart 800 illustrating operations of an example inventory ingestion engine and pricing system that identifies and prices for sale objects and provides market descriptors about the pricing, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to FIGS. 1, 3, 5, and 7. However, method 800 is not limited to the example embodiments.

In 810, an identification of a for sale object to be sold on an electronic marketplace is determined. For example, IE 102 may receive an image 108 of FSO 106, an e-mail receipt 304, or other indication of a purchased object 506, and identify a FSO 106 that a user wants to resell on EM 112.

In 820, a set of items similar to the identification of the for sale object is identified from the electronic marketplace. For example, as described above, IE 102 may identify a set of sold items 110 from EM 112 that are similar to FSO 106. Embodiments for identifying objects that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

In 830, a price for each of at least a subset of the set of similar items that have sold through the electronic marketplace is determined. For example, IE 102 may identify a price 128 of the objects that have been listed on and sold through EM 112, or one or more other websites associated with EM 112.

In 840, a sale price for the for sale object based on the determined prices of the items of the subset is generated. For example, as discussed above, IE 102 may generate a price 104 for the FSO 106 based on the pricing histories 128 of listed 120 and/or sold objects 110.

In 850, an image for one or more of the subset of items is retrieved from the electronic marketplace. For example, the images 118 of the sold objects 110 may be retrieved from EM 112.

In 860, a market descriptor comprising the sale price and the retrieved one or more images is generated. For example, IE 102 may generate a market descriptor 702 including a selection of the objects 110, 120 which are similar to FSO 106. Market descriptor 702 may include images 118A, prices 128A, sell times 130, and links 704. In an embodiment, market descriptor 702 may include a link that redirects a browser or app to a list of the identified objects of EM 112 that are identified as being similar to FSO 106. In an embodiment, this may only include recently listed or sold objects (e.g., within the previous 90 days).

In 870, the market descriptor is provided for display to the user. For example, IE 102 may display market descriptor 702 in an app or website, or e-mail or mobile phone, or next to image 108 of FSO 106, to name just some examples.

Figure 9:
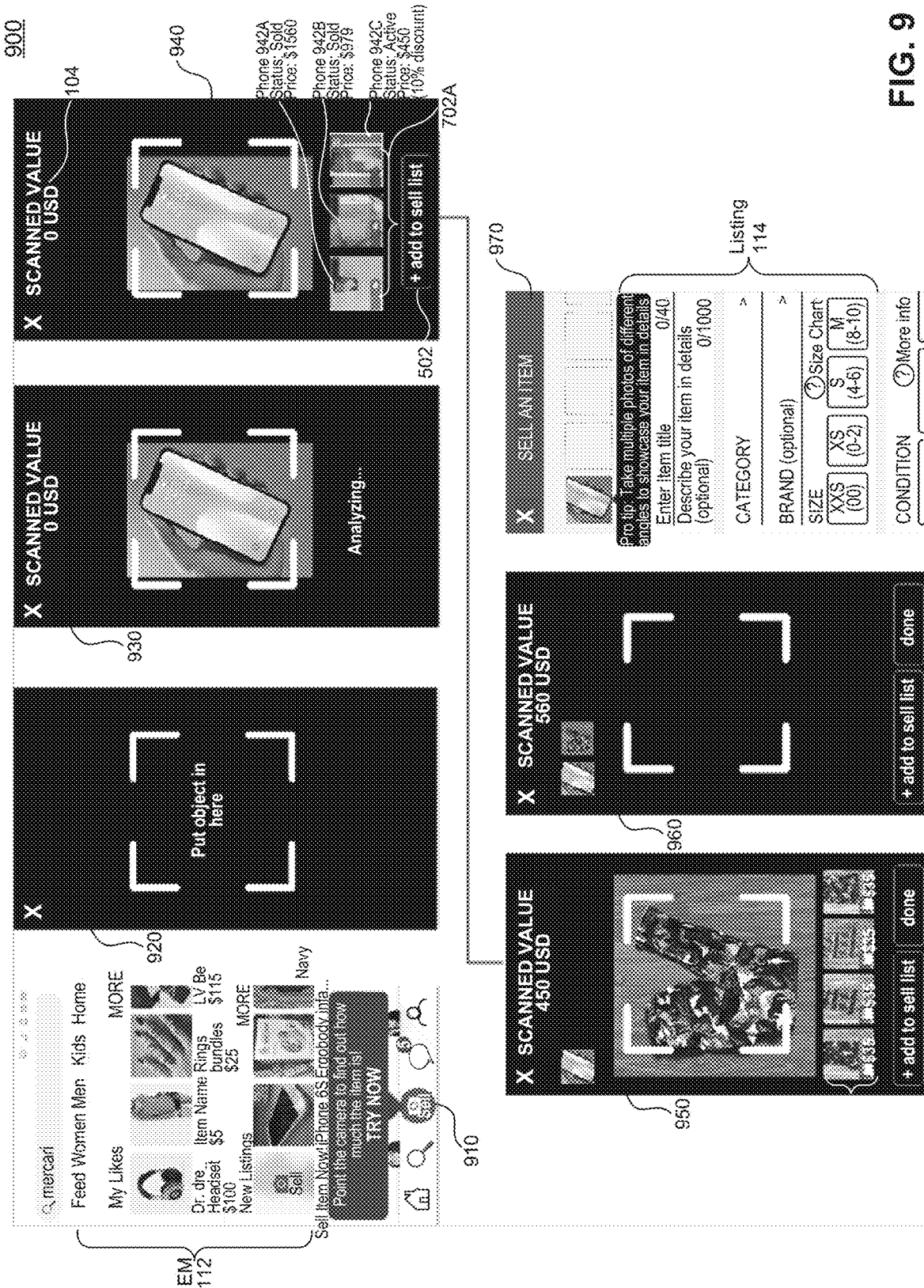
FIG. 9 is a block diagram illustrating example operations of an inventory ingestion engine and pricing system that identifies and prices for sale objects from images, according to some embodiments.

FIG. 9 is a block diagram illustrating example operations of an inventory ingestion engine and pricing system that identifies and prices for sale objects from images, according to some embodiments. FIG. 9 is generally related to FIGS. 1 and 2 and the associated teachings contained herein. Features and functionalities as described in the system 900 may be performed by the computing system 100 as described above with respect to FIG. 1.

In 910, an example EM 112 is displayed as it may appear in an app on a mobile device 116. EM 112 may display various products for sale that have been uploaded by various users and/or that are being sold on EM 112. EM 112 may be operating through an app on mobile device 116 and/or a web site. A user may select a camera button that may enable a user to select one or more previously taken pictures, or as illustrated in the example, take a new picture of an object.

In 920, the camera of a mobile device 116 (when operated through the EM 112 app) may identify a location where a user should center a FSO 106 in the camera's view. When the camera takes a picture, or detects that an object has been placed in the noted area, IE 102 may begin analyzing the FSO 106. In an embodiment, the app may take a picture of the object which may be uploaded to one or more servers, such as a cloud computing system, for analysis. As discussed above, IE 102 may then identify the FSO 106 based on the image 108.

Assume, for example, that the object is a phone. Based on identification 122 of the object (FSO 106) as being a phone, IE 102 may identify various sold objects 110 and/or listed objects 120 that are similar to FSO 106 (that is, that are phones). In an embodiment, IE 102 may provide a market descriptor 702 that includes images of a selection of the listed and/or sold objects.

As shown in 940, market descriptor 702 may include two sold objects (phones 942A, 942B), and one listed object (phone 942C). The market descriptor 702 may include images of the items, descriptions, a date sold (or time listed) and/or links to listings from EM 112. Price 104 may be 0 which may indicate that more information may be needed from a user to generate a price.

In an embodiment, additional feature information 124 may be required, that would enable IE 102 to generate a more accurate price determination. In an embodiment, a user may have selected phone 942C as the exemplary to generate the price 104, which may be added as the price as illustrated in 950.

As further illustrated in 950, to generate another listing, the user may scan a collection of four pants which are valued or priced at $35 each. In this example, the user or IE 102 may generate a discount for purchasing all four pants as a collection or set. Then, for example, instead of being priced at $140, the collection may be priced at $120. As illustrated in 960, the total for the scanned items may be $560.

The add to sell list button 502 may authorize IE 102 to generate or submit a listing 114 to sell FSO 106 on EM 112. In 970, a user may have selected to sell the phone from 940, and may be prompted to include additional information in listing 114. This may generate an updated suggested price, or the user may enter her own price and submit the listing 114 to EM 112.

Figure 10:
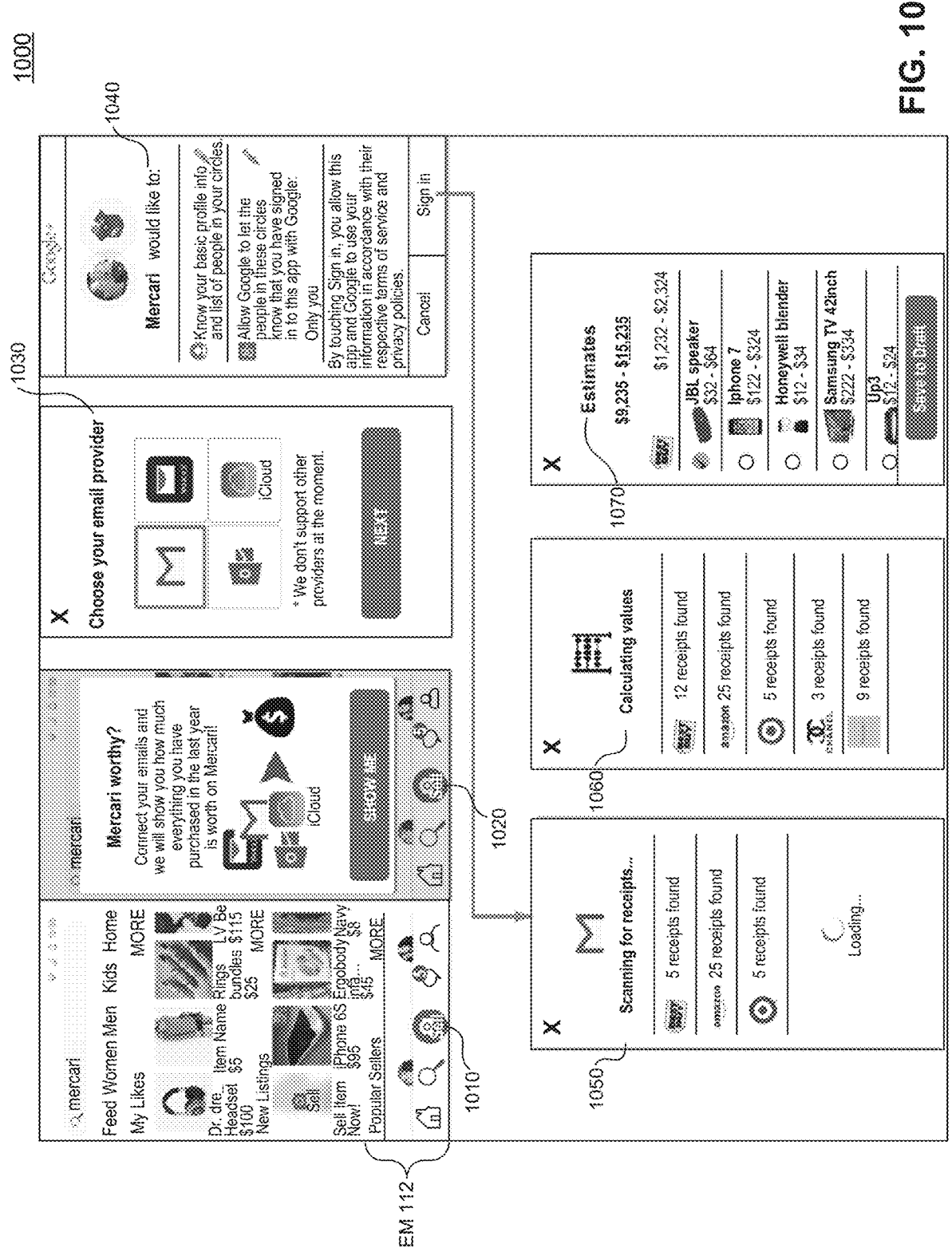
FIG. 10 is a block diagram illustrating example operations of an inventory ingestion engine and pricing system that identifies and prices for sale objects from email receipts, according to some embodiments.

FIG. 10 is a block diagram 1000 illustrating example operations of an inventory ingestion engine and pricing system that identifies and prices for sale objects from email receipts, according to another example embodiment. FIG. 10 is generally related to FIGS. 3 and 4 contained herein. Features and functionalities as described in the system 1000 may be performed by the computing system 300 as described above with respect to FIG. 3.

In 1010, an example EM 112 is displayed in an app or browser of a mobile device 116. EM 112 may display various products for that sale that have been uploaded by various users and/or that are being sold on EM 112. EM 112 may be operating through an app on mobile device 116. A user may select a camera button that may initiate functionality to enable a user to list products for sale.

In 1020, a user may be prompted with the opportunity to have their electronic message account (e.g., e-mail or social media account) scanned for items that may be sold on EM 112.

In 1030, a user may select which accounts are to be scanned. The example illustrates e-mail inboxes, cloud or network storage locations, and local disks or memory locations.

In 1040, a user may be provided an option to connect to one or more e-mail accounts 302, and authorize the EM 112 to retrieve information from those accounts. The user may be asked to provide account information (e.g., userid, password information) or to otherwise login to the account, granting IE or the app access to the messages.

In 1050, as described above, IE 102 may scan the e-mail account 302 for e-mail receipts 304 for both known-domains 314 and unknown domains 314. In an embodiment, IE 102 may only scan for known-domains 314, and may flag unknown domains 314 for subsequent manual processing by a user. In an embodiment, IE 102 may provide real-time updates of the receipts 304 that are found in the e-mail account 302 during an e-mail scan process.

In 1060, the scan of the e-mail account 302 for the e-mail receipts 304 may be completed, and IE 102 may generate prices 104. In another embodiment, price generation for identified receipts may be conducted simultaneously with scanning for email receipts.

In 1070, the prices for the identified FSOs 106 may be provided to the user. IE 102 may provide a price (or range of prices) for selling all the identified items or objects.

In an embodiment, IE 102 may store the previous scan. Then, for example, during a subsequent e-mail scan (which may occur periodically, or upon user request), the e-mail scan would occur quicker and consume fewer resources than the initial scan. IE 102 may update some of the prices, if a threshold period of time has passed or additional similar objects have been sold on EM 112, while other prices may not be updated. The app may show changes in prices and items from previous scans. A user may select particular items to sell, or for which to receive price updates.

Figure 11:
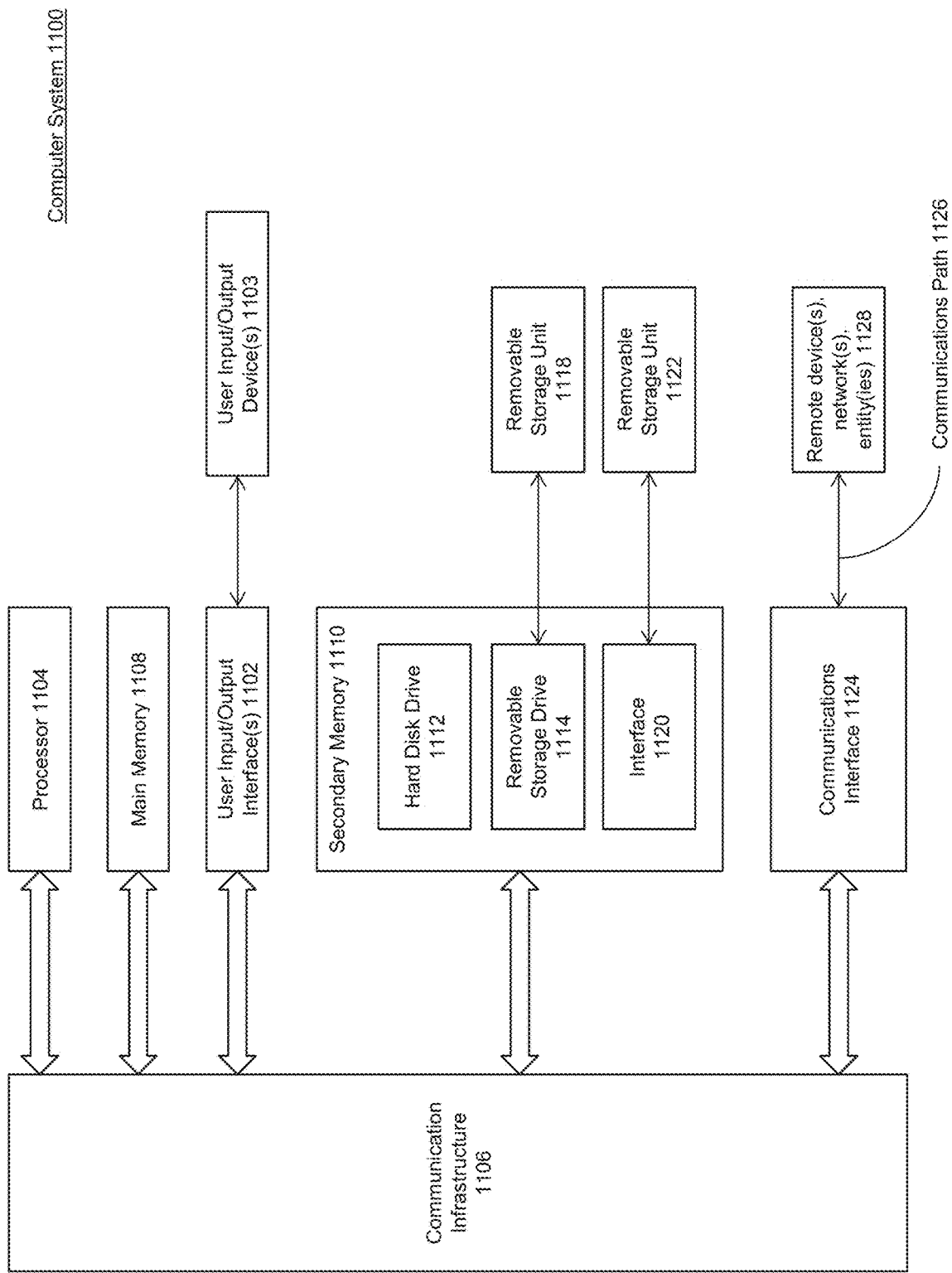
FIG. 11 is an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include customer input/output device(s) 1103, such as monitors, keyboards, pointing devices, etc., which may communicate with communication infrastructure 1106 through customer input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodi-

What is claimed is:

1. A computer-implemented method, comprising:
   displaying a visual indicator within a user interface of a mobile device configured to operate a camera of the mobile device, the visual indicator indicating a location wherein a user should place a for sale object;
   detecting that the for sale object was placed in the indicated location;
   causing the camera to capture an image of the for sale object responsive to the detecting;
   determining an identification of the for sale object to be sold on an electronic marketplace based on the image of the for sale object captured by the camera;
   identifying, from the electronic marketplace, a set of items similar to the identification of the for sale object;
   determining a price of each of at least a subset of the set of similar items that have sold through the electronic marketplace;
   generating a sale price for the for sale object based on the determined prices of the items of the subset;
   retrieving, from the electronic marketplace, an image for one or more of the items of the subset;
   generating a market descriptor comprising the sale price and the retrieved one or more images; and
   providing the market descriptor for display.

2. The computer-implemented method of claim 1, further comprising:
   generating a listing for the for sale object on the electronic marketplace; and
   submitting the listing to the electronic marketplace listing the for sale object.

3. The computer-implemented method of claim 1, wherein the providing comprises:
   generating an e-mail comprising the market descriptor, wherein the identification is based on an e-mail receipt from a retailer; and
   providing the e-mail to a user account.

4. The computer-implemented method of claim 1, wherein the providing comprises:
   generating an e-mail comprising the market descriptor, wherein the identification is based on a selection of a resell icon associated with a purchase history page of a retailer; and
   providing the e-mail to a user account.

5. The computer-implemented method of claim 1, wherein the retrieving comprises:
   identifying which of the subset of the items were most recently sold on the electronic marketplace; and
   retrieving images of the most recently sold objects.

6. A system comprising at least one processor, the at least one processor configured to perform operations comprising:
   displaying a visual indicator within a user interface of a mobile device configured to operate a camera of the mobile device, the visual indicator indicating a location wherein a user should place a for sale object;
   detecting that the for sale object was placed in the indicated location;
   causing the camera to capture an image of the for sale object responsive to the detecting;
   determining an identification of the for sale object to be sold on an electronic marketplace based on the image of the for sale object captured by the camera;
   identifying, from the electronic marketplace, a set of items similar to the identification of the for sale object;
   determining a price of each of at least a subset of the set of similar items that have sold through the electronic marketplace;
   generating a sale price for the for sale object based on the determined prices of the items of the subset;
   retrieving, from the electronic marketplace, an image for one or more of the items of the subset;
   generating a market descriptor comprising the sale price and the retrieved one or more images; and
   providing the market descriptor for display.

7. The system of claim 6, the operations further comprising:
   generating a listing for the for sale object on the electronic marketplace; and
   submitting the listing to the electronic marketplace listing the for sale object.

8. The system of claim 6, wherein the providing comprises:
   generating an e-mail comprising the market descriptor, wherein the identification is based on an e-mail receipt from a retailer; and
   providing the e-mail to a user account.

9. The system of claim 6, wherein the providing comprises:
   generating an e-mail comprising the market descriptor, wherein the identification is based on a selection of a resell icon associated with a purchase history page of a retailer; and
   providing the e-mail to a user account.

10. The system of claim 6, wherein the retrieving comprises:
    identifying which items of the subset of the items were most recently sold on the electronic marketplace; and
    retrieving images of the most recently sold objects.

11. A non-transitory computer-readable medium having instructions stored thereon that, when executed by at least one computing device, cause the at least one computing device to perform operations comprising:
    displaying a visual indicator within a user interface of a mobile device configured to operate a camera of the mobile device, the visual indicator indicating a location wherein a user should place a for sale object;
    detecting that the for sale object was placed in the indicated location;
    causing the camera to capture an image of the for sale object responsive to the detecting;
    determining an identification of the for sale object to be sold on an electronic marketplace based on the image of the for sale object captured by the camera;
    identifying, from the electronic marketplace, a set of items similar to the identification of the for sale object;
    determining a price of each of at least a subset of the set of similar items that have sold through the electronic marketplace;
    generating a sale price for the for sale object based on the determined prices of the items of the subset;
    retrieving, from the electronic marketplace, an image for one or more of the items of the subset;
    generating a market descriptor comprising the sale price and the retrieved one or more images; and
    providing the market descriptor for display.

12. The non-transitory computer-readable medium of claim 11, the operations further comprising:
    generating a listing for the for sale object on the electronic marketplace; and
    submitting the listing to the electronic marketplace listing the for sale object.

13. The non-transitory computer-readable medium of claim 11, wherein the providing comprises:
- generating an e-mail comprising the market descriptor, wherein the identification is based on an e-mail receipt from a retailer; and
- providing the e-mail to a user account.

14. The non-transitory computer-readable medium of claim 11, wherein the providing comprises:
- generating an e-mail comprising the market descriptor, wherein the identification is based on a selection of a resell icon associated with a purchase history page of a retailer; and
- providing the e-mail to a user account.

\* \* \* \* \*

UNITED STATES PATENT AND TRADEMARK OFFICE
CERTIFICATE OF CORRECTION

| | | |
|---|---|---|
| PATENT NO. | : 12,361,441 B2 | Page 1 of 1 |
| APPLICATION NO. | : 18/130686 | |
| DATED | : July 15, 2025 | |
| INVENTOR(S) | : Schubert et al. | |

It is certified that error appears in the above-identified patent and that said Letters Patent is hereby corrected as shown below:

In the Claims

In Column 23, Claim 5, Line 50, delete "which" and insert -- which items --, therefor.

Signed and Sealed this
Second Day of September, 2025

Coke Morgan Stewart
*Acting Director of the United States Patent and Trademark Office*